United States Patent [19]

Nudo et al.

[11] Patent Number: 4,979,490
[45] Date of Patent: Dec. 25, 1990

[54] ADJUSTABLE POST-MOUNTED CAMPFIRE GRILLE

[75] Inventors: Alexander S. Nudo; Samuel Nudo, both of Springfield, Ill.

[73] Assignee: Nudo Products, Inc., Springfield, Ill.

[21] Appl. No.: 382,409

[22] Filed: Jul. 24, 1989

[51] Int. Cl.5 .............................................. F24B 3/00
[52] U.S. Cl. .................................... 126/30; 126/25 A; 126/29; 248/410; 248/545
[58] Field of Search ............................ 126/30, 25, 29; 248/410, 545

[56] References Cited

U.S. PATENT DOCUMENTS

| | | | |
|---|---|---|---|
| 2,977,953 | 4/1961 | Dowdy | 126/30 |
| 3,395,692 | 8/1968 | Johns | 126/30 |
| 3,588,023 | 6/1971 | Cohen | 248/410 |
| 3,734,441 | 5/1973 | Lux | 248/410 X |
| 4,083,354 | 4/1978 | Claire et al. | 126/30 |
| 4,459,787 | 7/1984 | Wilcox | 248/545 X |
| 4,469,289 | 9/1984 | Gebo | 248/410 X |
| 4,753,411 | 6/1988 | Lechner et al. | 248/545 X |
| 4,836,480 | 6/1989 | Besner | 126/30 X |

Primary Examiner—Larry Jones
Attorney, Agent, or Firm—Wood, Phillips, Mason, Recktenwald & Vansanten

[57] ABSTRACT

A device for added convenience in campfire cooking. The device comprises a telescoping post either to be driven into the ground by way of a self-contained sleeve hammer or to be held erect by a circular grille stand, a telescoping height adjustment made possible by use of a barrel washer, an adjustable grille arm to install at the upper end of the telescoping steel post, the adjustable grille arm to invert 180 degrees to provide for added adjustment of the grille plate over the fire, the grille plate to attach onto the grille arm in normal or inverted position, an anti-rotating clip to prevent unwanted spinning of the grille plate, grille arm slots in inner post so cut as to hold the grille arm horizontal, thumb screws in sleeve hammer to fasten to post for storage and to serve as hand guide when in use, thumb screws in vertical portion of grille stand to turn in and stop unwanted rotation of grille when in use.

13 Claims, 5 Drawing Sheets

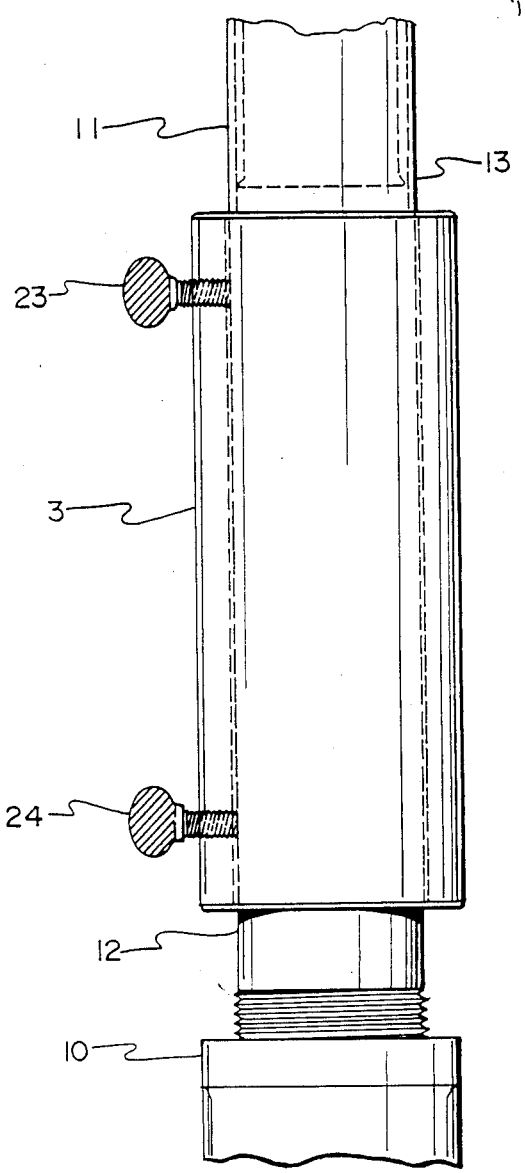
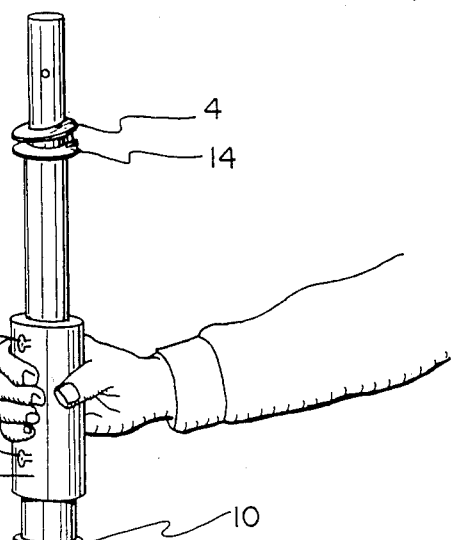
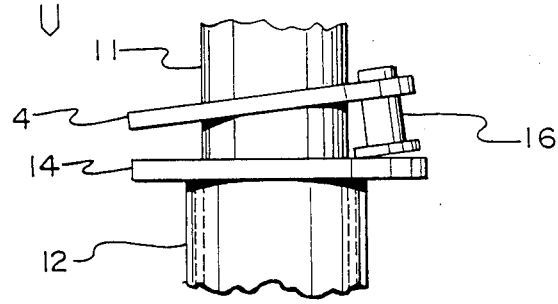
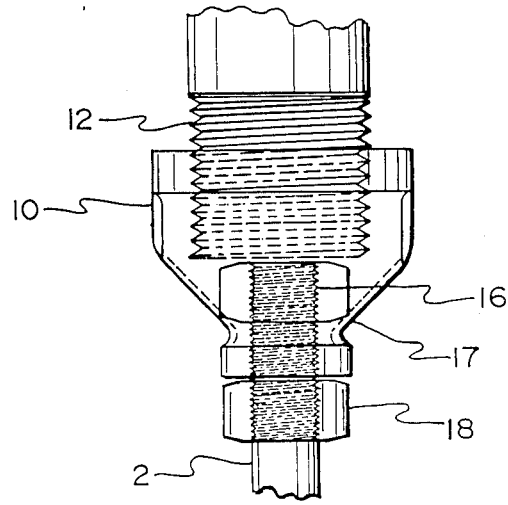

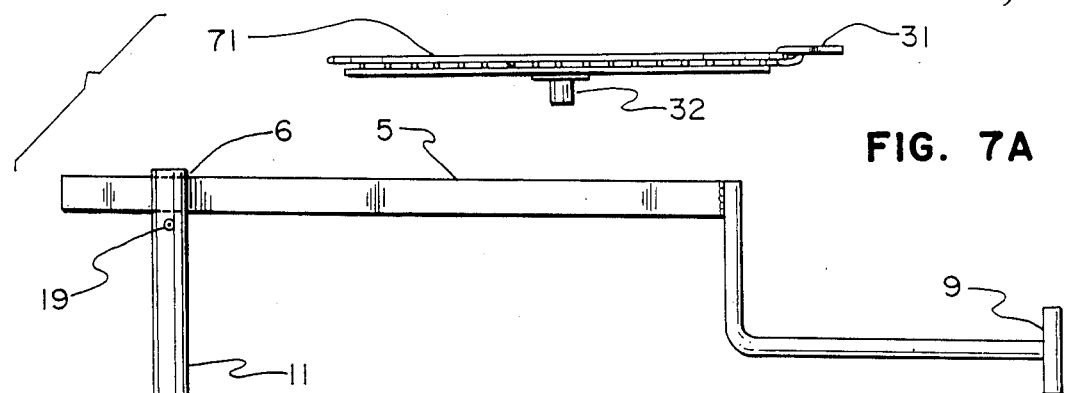
FIG. 7A
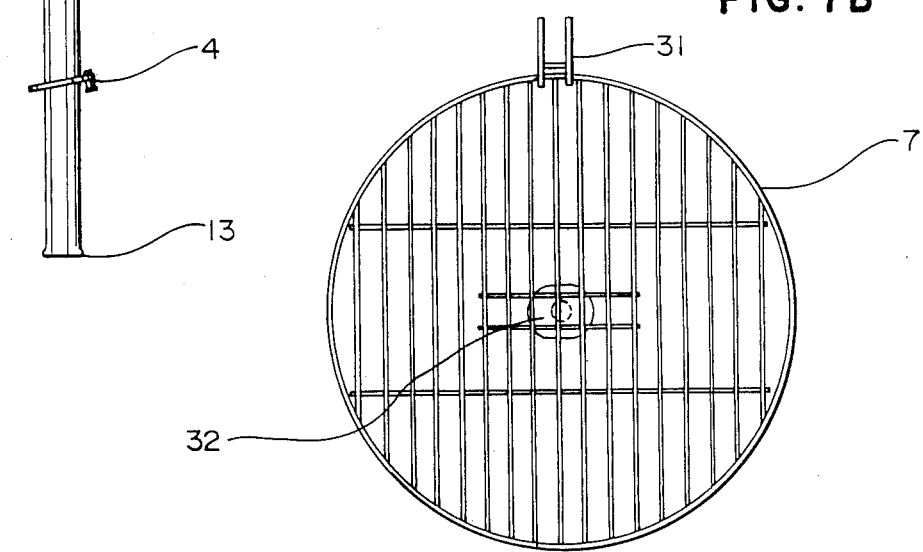
FIG. 7B
FIG. 9
FIG. 7C
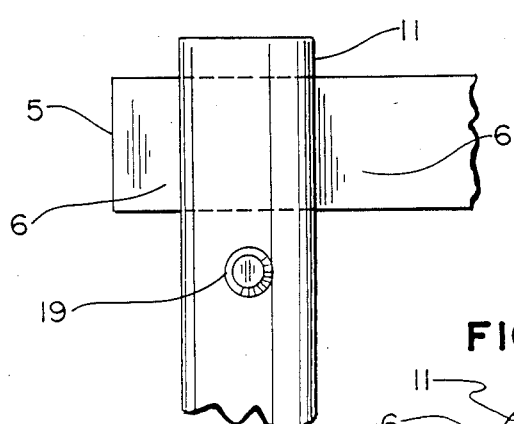
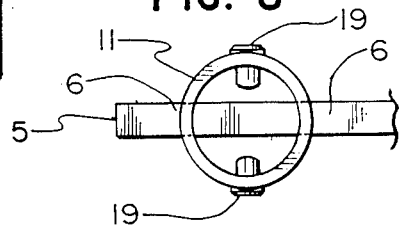
FIG. 8
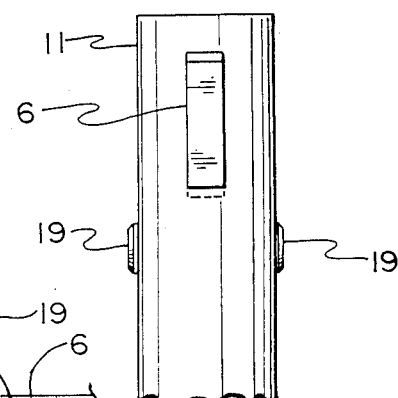

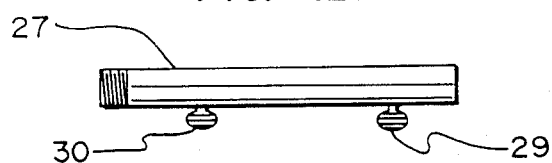
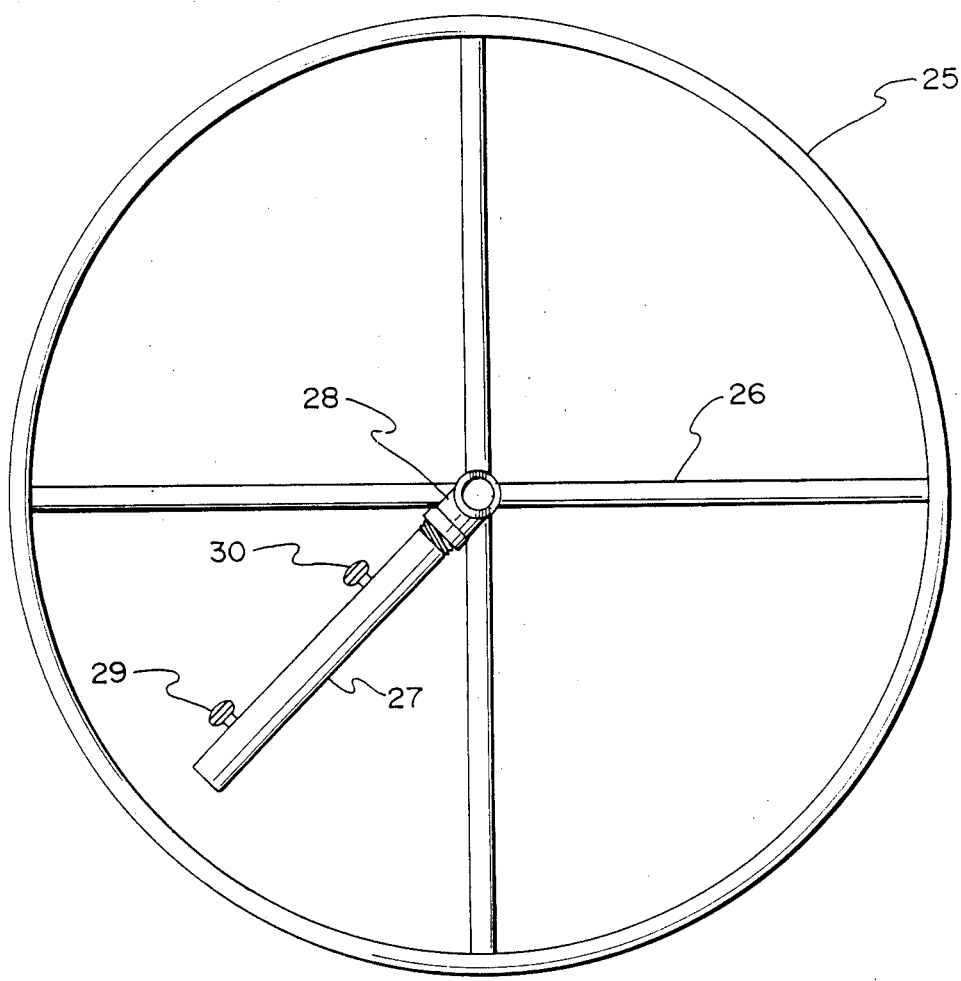
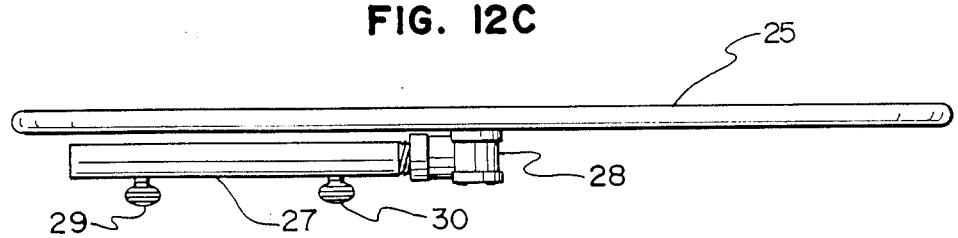

ADJUSTABLE POST-MOUNTED CAMPFIRE GRILLE

BACKGROUND OF THE INVENTION

This invention relates to improvements in post-mounted campfire grilles which greatly increase their utility and flexibility.

Post-mounted campfire grilles are broadly old (e.g.; Hardin, U.S. Pat. No. 2,522,223, and Garske & Swanson, U.S. Pat. No. 3,526,217, and Parsons, U.S. Pat No. 2,324,233). But no known post-mounted campfire grille combines a telescoping post for height adjustment with a pointed drive-pin and sleeve hammer for driving the post into the ground, and a grille support arm that adjusts both toward the campfire and back away from it, and also which will swing to the left or right 180 degrees, and as an alternative support for hard surfaces, a circular post support stand. There is an ever-increasing interest in travel and camping, and accompanying this development there is a need for a light-weight, adjustable, easy to erect and easy to carry campfire grille.

SUMMARY OF THE INVENTION

The present invention discloses the use of a primary support post for the campfire grille comprising telescoping steel pipes for height adjustment together with a convenient height adjusting barrel washer.

At the lower end of the telescoping post, a threaded pipe reducer is turned onto the larger of the telescoping pipes to provide a means for attaching the steel ground pin and also to provide a shoulder for the sleeve hammer driving weight.

At the top of the larger of the telescoping pipes is a washer that is welded into place. An oversize barrel washer with an offset rivet leg then is slid onto the upper and smaller telescoping pipe. When the smaller pipe is slid into the larger one, the oversize barrel washer then comes to rest diagonally on the welded washer on the lower pipe. In doing this the barrel washer bites into the steel of the upper pipe. This gripping holds the height adjustment where desired and also permits the upper pipe to turn a full 360 degrees as desired.

At the top of the upper pipe, and milled into the pipe are vertical slots with 90-degree corners at 180 degrees to each other. These slots admit the vertical edge of a flat rod of undetermined length, one end of which is welded to a grille-holding arm with a variable offset. The flat rod is designed to slide toward the fire or back away from it. It is also designed for a 180-degree inversion to add to the possible height adjustments that can be made to bring the grille plate closer to the fire or move it further away. The slots are so cut that the edge of the flat grille-holding arm will rest on the bottom end of one and the upper end of the other slot on the opposite side so that the grille arm will be held in a perfectly horizontal position.

At the opposite end of the grille arm there are round grille plate holder shafts which are welded to it.

In order to drive the ground pin into the soil the weighted sleeve hammer is used manually. Thumb screws in the sleeve hammer serve both as a guide for the operator's hands, keeping them clear of hammer striking surfaces, and to tighten against the post for transportation and storage.

BRIEF DESCRIPTION OF DRAWINGS

FIG. 3 is a detail view showing action of sleeve hammer.

FIG. 4 is a detail view showing outer post portion with telescoping inner post portion with retaining washer fixed on outer post portion and with barrel washer resting on retaining washer and gripping inner portion of post portion.

FIG. 5 is a detail view of lower end of the telescoping post with drive pin attached.

FIG. 6 is a detail view showing sleeve hammer attached to post and with flared lower end of inner portion of pipe.

FIG. 7-A is a side view of the inner portion of the telescoping post with the grille arm inserted into the top of it and with the grille plate removed from the arm and shown above the arm.

FIG. 7-B is a top view of the grille plate with anti-rotation clip in place and with the grille plate fitting in the center.

FIG. 7-C is a side view of the top of the telescoping post with vertical slots for grille arm and barrel washer retaining rivets.

FIG. 8 is a top end view of the telescoping post with grille arm portion inserted into slots, and with barrel washer retaining rivets.

FIG. 9 is a side view of the top of the telescoping post with vertical slots at left and right with grille arm inserted, and with barrel washer retaining rivet.

FIG. 12A is a side view of the housing of one alternative support structure of the invention.

FIG. 12B is a top view of the circular stand with the post housing pipe turned into the T fitting for storage and transportation.

FIG. 12C is a side view of the circular stand with the post housing pipe turned into the T fitting for storage and transportation.

DESCRIPTION OF A PREFERRED EMBODIMENT

Figure 1:
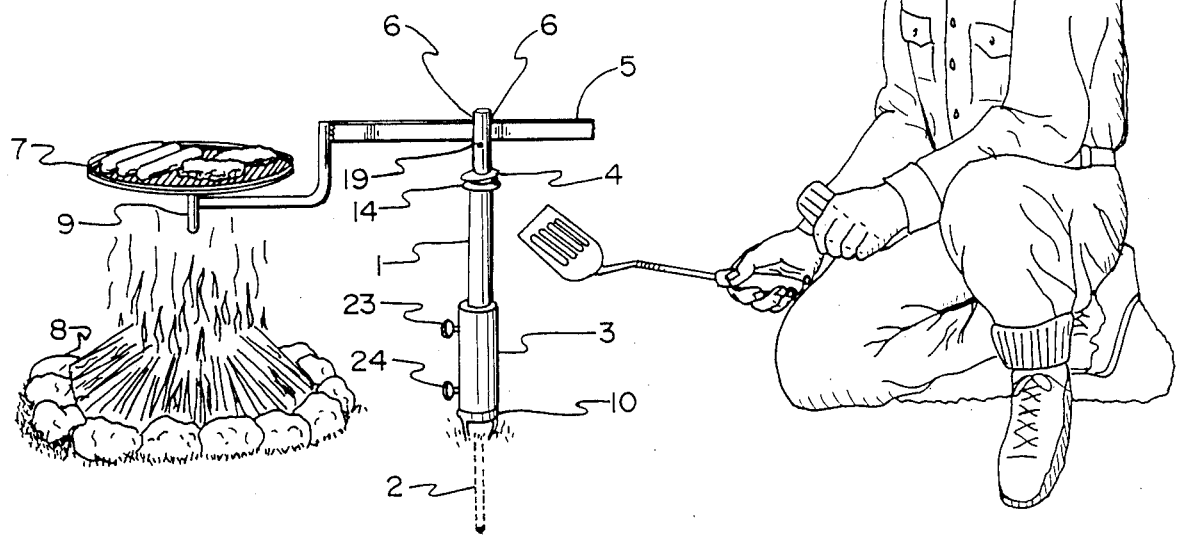
FIG. 1 is a pictorial view illustrating use of our campfire grille with ground pin.

Referring now to FIG. 1, there is at 1 a telescoping steel post held in upright position by a drive pin 2 which is driven into the ground by sleeve hammer 3. Height of post is adjusted to desired position and held there by barrel washer 4.

Grille arm 5 is inserted through slot 6 in the top of the post. Grille arm 5 also supports grille plate 7 at the desired height above campfire. Grille plate 7 is attached to grille shaft 9. Grille arm 5 can also be inverted 180 degrees and reinserted in grille arm slots 6 and grille plate 7 can be attached again to the opposite end of grille shaft 9.

Figure 2:
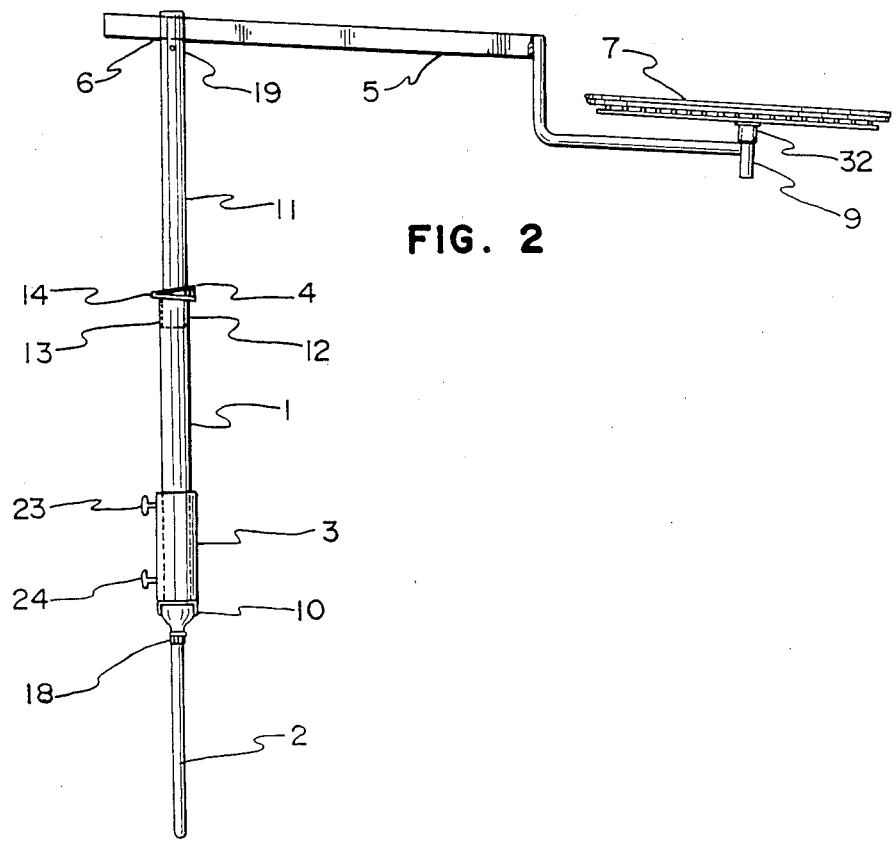
FIG. 2 is a plan view of the telescoping post with sleeve hammer, and with grille arm and grille plate attached to the post.

FIG. 2 represents the complete assembly of the invention. Telescoping post 1 has an inner member 11 and an outer member 12. Bottom of inner member 11 is flared outwardly at 13. A retaining washer 14 is welded to the top of outer pipe 12 to serve as a buffer to pipe flare 13. Barrel washer 4 engages inner pipe 11 and bites into the metal to hold post 1 at the desired height for grilling. Retaining washer 14 also serves as a circular stool to allow barrel washer 4 to rotate a full 360 degrees and maintain desired post height.

Grille arm 5 is loosely attached to the top of inner member of the telescoping post 11 by way of vertical slots 6. Grille arm 5 can be adjusted toward the fire or away from it. Grille plate 7 is attached to one end of grille shaft 9.

Sleeve hammer 3 slides up and down on the outer member of the post 12. Sleeve hammer 3 is used to strike pipe reducer coupling 10 to drive steel pin 2 into the ground.

As shown in FIG. 3, sleeve hammer 3 is used to strike pipe reducer coupling 10 to drive steel pin 2 into the ground to the desired depth.

Illustrated in FIG. 4 is a detail view of height adjusting mechanism on post 1. Outer member of post 12 has welded to its upper end a retaining washer 14. Inner member of post 11 telescopes into outer member 12. Barrel washer 4 fits around post inner member 11. Rivet 16 which is part of barrel washer 4 rests on retaining washer 14 creating a biting action on inner member of post 11 causing post 1 to remain at selected height.

Shown in FIG. 5 a pipe reducer coupling 10 is turned onto threads on the lower end of outer member of post 12. Steel pin 2 is threaded into lower end of pipe reducer 10. Steel nut 16 is tightened down until shoulders engage inner portion of pipe reducer 10 and is in firm contact at 17. Lock nut 18 secures steel pin 2 in firm contact with underside of pipe reducer 10.

In FIG. 6 there is a detail view of inner member of post 11 and outer member of post 12 and sleeve hammer 3. Sleeve hammer 3 strikes upper end of pipe reducer coupling 10.

Illustrated in FIG. 7 is a detail view of the upper end of inner post member 11 with vertical grille arm slots 6. Rivets 19 serves to retain barrel washer 4 from sliding off and getting lost.

Seen in FIG. 7-B is a top view of grille plate 7 with anti-rotating clip 31 and grille plate fitting 32.

In FIG. 7-C there is illustrated a view from the top of the telescoping post showing vertical slots for the grille arm and position of barrel washer retaining rivets.

In FIG. 8 there is a detail end view of steel post from above. Grille arm 5 slides through slots 6 and are retained in place by inner member of post 11. Rivets 19 retain barrel washer.

FIG. 9 illustrates a profile view of steel post 1 turned at 90 degrees. Inner member of post 11 has vertical grille arm slots 6 to admit and retain grille arm 5. Rivets 19 retain barrel washer.

Figure 10:
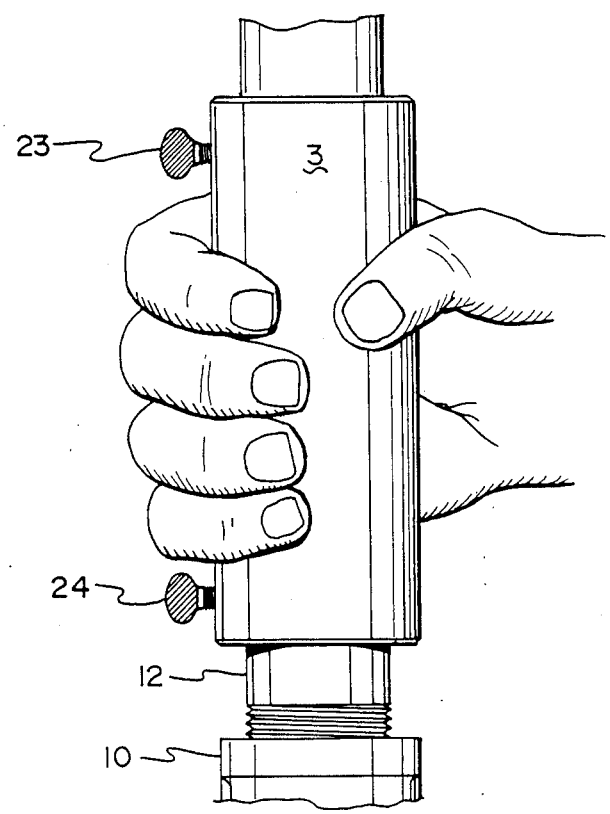
FIG. 10 is a close-up view of the sleeve hammer with thumb screws which serve as guides to keep hands from injury at top and bottom.

Shown in FIG. 10 is a detail view of outer member of post 12 and sleeve hammer 3. Thumb screws 23 and 24 are spaced to serve as guides for hands to prevent hand injury at striking surfaces. Thumb screws 23 and 24 tighten against post 12 for transportation and storage.

Figure 11:
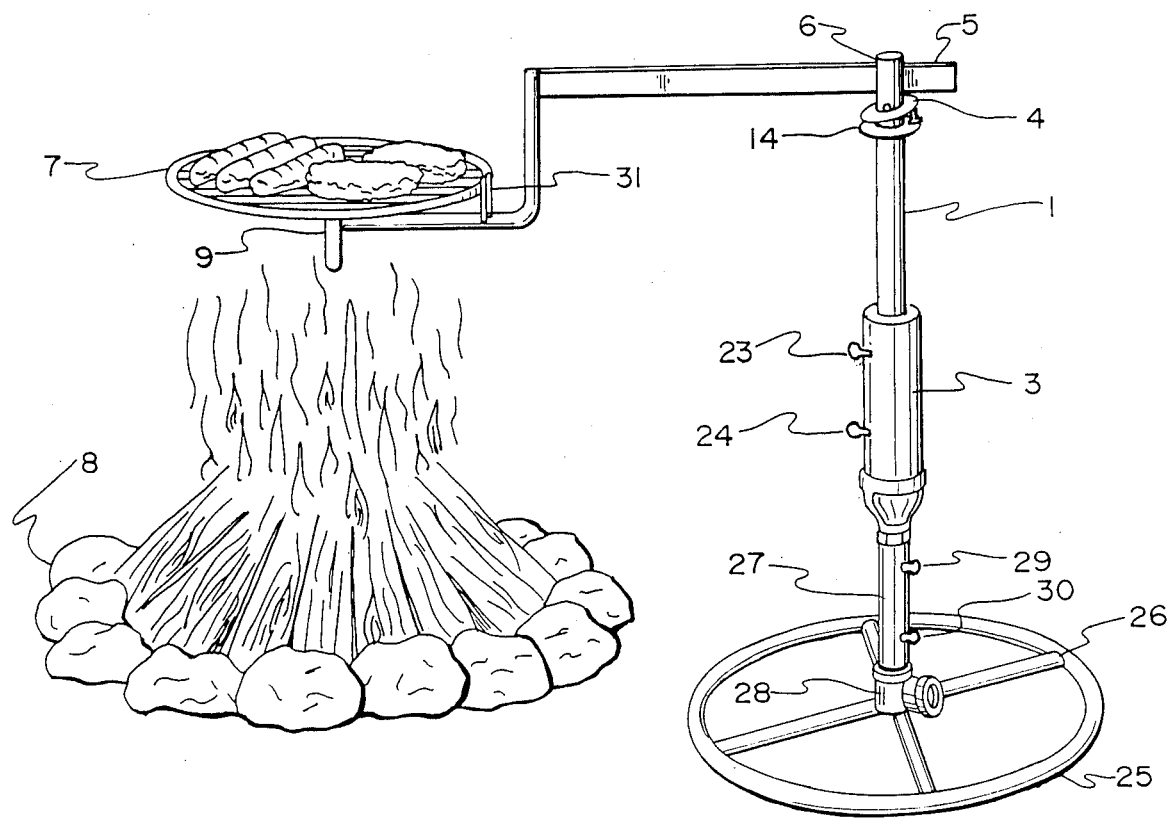
FIG. 11 is a three quarter view of the post-mounted campfire grille supported by a circular grille stand designed for use on hard surfaces where the drive pin cannot be used.

Illustrated in FIG. 11 is a three-quarter view of post mounted campfire grille mounted upright in circular stand 25. Steel pin 2 is inserted into pin housing 27. Pin housing 27 is threaded into pipe T 28. For storage and transportation pin housing 27 is threaded into horizontal threads of pipe T 28.

Seen in FIG. 12 is a top view of circular stand 25 showing positions of cross arms 26 and pipe T 28 welded at the center. Pin housing pipe portion 27 is shown installed horizontally for storage or transportation. Above is a separate view of pin housing portion 27 and thumb screws 29 and 30 in place. Below is a horizontal view of circular stand 25 with welded pipe T 28 at the center and with pin housing portion 27 inserted in T 28 as for storage or transportation.

WHAT WE CLAIM IS:

1. A vertically adjustable grille comprising:
   a telescoping post having an outer shaft with an open upper end and an inner shaft coaxially received within the outer shaft, the inner shaft being moveable axially within the outer shaft and being rotatable about the longitudinal axis of the post;
   means for supporting the post on the ground in a substantially upright position;
   a support arm cantilevered outwardly from the post;
   a grille plate supported on the free end of the support arm;
   an annular barrel washer disposed on the inner shaft to maintain the axial relationship of the inner shaft and the outer shaft when the axis of the barrel washer is offset from the longitudinal axis of the inner shaft;
   an annular retaining ring affixed to the open upper end of the outer shaft; and
   an offset rivet having one end attached to the barrel washer and a free end engageable with the retaining ring to support the barrel washer in the offset position, the free end of the offset rivet being slidable on the retaining ring so that the inner shaft, barrel washer and the grille plate support arm may be rotated about the longitudinal axis of the post.

2. A vertically adjustable grille as claimed in claim 1 wherein the end of the inner shaft disposed within the outer shaft has an outward flare and wherein the diameter of the outward flare is greater than the inner diameter of the retaining ring so that the end of the inner shaft may not be moved past the retaining ring on the outer shaft.

3. A vertically adjustable grille as claimed in claim 1 wherein a portion of the inner shaft disposed outside of the outer shaft includes stop means disposed between the retaining ring and the support arm for preventing the inner shaft from sliding past the stop means into the outer shaft.

4. A vertically adjustable barbecue grille comprising:
   an upright stand;
   an invertible arm cantilevered outwardly from the stand to a distal end, the invertible arm being removably attached to the upright stand at a proximal portion, and the distal end being offset vertically from the proximal portion; and
   a grille plate supported on the distal end of the invertible arm,
   wherein the invertible arm may be attached to the stand with the distal end closer to the ground and alternatively may be inverted to a second position with the distal end disposed farther from the ground.

5. A vertically adjustable barbecue grille as claimed in claim 4 wherein the proximal portion of the invertible arm is slidably received in openings in the upright stand so that the grille plate may be moved radially with respect to the upright stand.

6. A barbecue grille comprising:
   an upright stand;

an arm extending radially from the stand, the arm having a first end attached to the stand and a free end spaced from the stand;

a grille plate rotatably mounted on and overlying the free end of the arm;

an anti-rotation clip having a pair of spaced tines connected to the grille plate and extending downwardly toward the arm, the tines having a length sufficient to extend downward to straddle the arm to prevent rotation of the grille plate with respect to the arm.

7. A barbecue grille as claimed in claim 6 wherein the anti-rotation clip is pivotally connected to the grille plate and is pivotable downwardly toward the arm.

8. A portable barbecue grille supportable on a surface in alternative ways, the portable barbecue grille including:

a post;

a support arm cantilevered from the post and having a distal free end;

a grille plate mounted on the distal free end of the support arm;

a first alternative supporting structure selectively connectible with the post, including a drive pin removably attached to one end of the post and coaxial with the post for supporting the post on the ground, a sleeve hammer disposed coaxially on the post and slidable thereon, an impact surface disposed on the post between the sleeve hammer and the drive pin to receive impact from the sleeve hammer to drive the drive pin into the ground; and a second alternative supporting structure selectively connectible with the post, including a housing complementary to the drive pin and having an open end to receive the drive pin coaxially, and a base for supporting the housing in a substantially upright position on a flat surface.

9. A portable barbecue grille as claimed in claim 8 further comprising a reducer coupling disposed between the drive pin and the post.

10. A portable barbecue grille as claimed in claim 8 wherein the base includes means for alternatively holding the housing substantially flat against the base for storage.

11. A portable barbecue grille kit providing alternative supporting structures for use on flat surface and on the ground, the grille kit comprising:

a post;

a support arm attachable as a cantilever to the post;

a grille plate mountable on a distal end of the support arm;

a first alternative supporting structure including a drive pin for supporting the post on the ground, the drive pin being attachable coaxially to one end of the post, a sleeve hammer to be disposed coaxially on the post and slidable thereon, and an impact surface to be disposed on the post between the sleeve hammer and the drive pin to receive impact from the sleeve hammer to drive the pin into the ground to support the grille on the ground;

a second alternative supporting structure including a base for supporting the post on a flat surface, the base including means for receiving one end of the post to support the post in a substantially upright position on the flat surface.

12. A portable barbecue grille kit as claimed in claim 11 further comprising a housing complementary to the drive pin and having an open end to receive the drive pin, the other end of the housing being receivable within the means for receiving one end of the post so that the post, drive pin, sleeve hammer and impact surface can be supported on the base.

13. A portable barbecue grille kit as claimed in claim 12 further comprising a reducer coupling to be attached between the drive pin and the post.

* * * * *